US012424359B2

(12) United States Patent
Lan et al.

(10) Patent No.: US 12,424,359 B2
(45) Date of Patent: *Sep. 23, 2025

(54) R-T-B SERIES PERMANENT MAGNET MATERIAL, RAW MATERIAL COMPOSITION PREPARATION METHOD AND APPLICATION

(71) Applicant: FUJIAN GOLDEN DRAGON RARE-EARTH Co., Ltd., Fujian (CN)

(72) Inventors: Qin Lan, Fujian (CN); Dawei Shi, Fujian (CN); Jiaying Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 33 days.

This patent is subject to a terminal disclaimer.

(21) Appl. No.: 17/630,596

(22) PCT Filed: Jul. 7, 2020

(86) PCT No.: PCT/CN2020/100574

§ 371 (c)(1),
(2) Date: Jan. 27, 2022

(87) PCT Pub. No.: WO2021/135142

PCT Pub. Date: Jul. 8, 2021

(65) Prior Publication Data

US 2022/0344083 A1 Oct. 27, 2022

(30) Foreign Application Priority Data

Dec. 31, 2019 (CN) ......................... 201911418433.8

(51) Int. Cl.

*H01F 1/057* (2006.01)
*B22F 9/04* (2006.01)
(Continued)

(52) U.S. Cl.

CPC .............. *H01F 1/0577* (2013.01); *B22F 9/04* (2013.01); *C22C 38/002* (2013.01);
(Continued)

(58) Field of Classification Search

None
See application file for complete search history.

(56) References Cited

U.S. PATENT DOCUMENTS

2010/0233016 A1 9/2010 Tsubokura et al.
2014/0132377 A1 5/2014 Nakajima et al.
(Continued)

FOREIGN PATENT DOCUMENTS

CN 101542644 A 9/2009
CN 102412044 A * 4/2012 ........... H04L 1/1861
(Continued)

OTHER PUBLICATIONS

Sep. 28, 2020 International Search Report issued in International Patent Application No. PCT/CN2020/100574.
(Continued)

*Primary Examiner* — Xiaobei Wang
(74) *Attorney, Agent, or Firm* — Houston Beshining Law Office PLLC; Liangang Ye

(57) ABSTRACT

An R-T-B series permanent magnet material, a raw material composition, a preparation method, and an application. The R-T-B series permanent magnet material comprises the following components: R: 29-31.0 wt. %, RH is greater than 1 wt. %, B: 0.905-0.945 wt. %, C: 0.04-0.15 wt. %, N: 0.1-0.4 wt. %, and Fe: 67-69 wt. %, wherein R comprises RL and RH, RL is a light rare earth element, RL comprises Nd, RH is a heavy rare earth element, a $(RL_{1-y}RH_y)_2T_{17}C_x$ phase is present at the grain boundary of the R-T-B series permanent magnet material, x: 2-3, y: 0.15-0.35, and T must comprise Fe, and also comprises one or more among Co, Ti
(Continued)

and N. The permanent magnet material retains relative high Br and Hcj under different heat treatment temperatures.

16 Claims, 1 Drawing Sheet

(51) Int. Cl.

| | |
|---|---|
| ***C22C 38/00*** | (2006.01) |
| ***C22C 38/10*** | (2006.01) |
| ***C22C 38/14*** | (2006.01) |
| ***C22C 38/16*** | (2006.01) |

(52) U.S. Cl.

CPC ............ *C22C 38/005* (2013.01); *C22C 38/10* (2013.01); *C22C 38/14* (2013.01); *C22C 38/16* (2013.01); *B22F 2201/03* (2013.01); *B22F 2301/355* (2013.01); *C22C 2202/02* (2013.01); *Y10T 428/12014* (2015.01)

(56) References Cited

U.S. PATENT DOCUMENTS

| | | | | |
|---|---|---|---|---|
| 2014/0327503 | A1 | 11/2014 | Sagawa et al. | |
| 2016/0225502 | A1 | 8/2016 | Miwa et al. | |
| 2018/0090249 | A1* | 3/2018 | Ohashi | B22F 3/16 |
| 2018/0277288 | A1 | 9/2018 | Iwasaki et al. | |
| 2019/0267166 | A1* | 8/2019 | Nagata | C22C 38/005 |
| 2019/0276917 | A1* | 9/2019 | Iwasaki | H01F 1/0577 |
| 2019/0295752 | A1 | 9/2019 | Kitaoka et al. | |
| 2019/0304640 | A1 | 10/2019 | Nagamine et al. | |
| 2020/0299813 | A1* | 9/2020 | Tsubokura | H01F 1/0577 |
| 2021/0054484 | A1 | 2/2021 | Lan et al. | |
| 2023/0118859 | A1* | 4/2023 | Fujikawa | C22C 38/06<br>420/582 |

FOREIGN PATENT DOCUMENTS

| | | | | |
|---|---|---|---|---|
| CN | 103650073 A | | 3/2014 | |
| CN | 105018845 A | | 11/2015 | |
| CN | 105845304 A | | 8/2016 | |
| CN | 110619984 A | | 6/2018 | |
| CN | 108597708 A | | 9/2018 | |
| CN | 110299234 A | | 10/2019 | |
| CN | 110323020 A | | 10/2019 | |
| CN | 110428947 A | | 11/2019 | |
| CN | 110571007 A | | 12/2019 | |
| CN | 110993232 A | | 12/2019 | |
| WO | WO-2021031724 A1 | * | 2/2021 | C22C 38/002 |

OTHER PUBLICATIONS

Sep. 28, 2020 Written Opinion of the International Searching Authority issued in International Patent Application No. PCT/CN2020/100574.

Chinese Patent Application No. 201911418433.8 (Priority document of the U.S. Appl. No. 17/630,596).

* cited by examiner

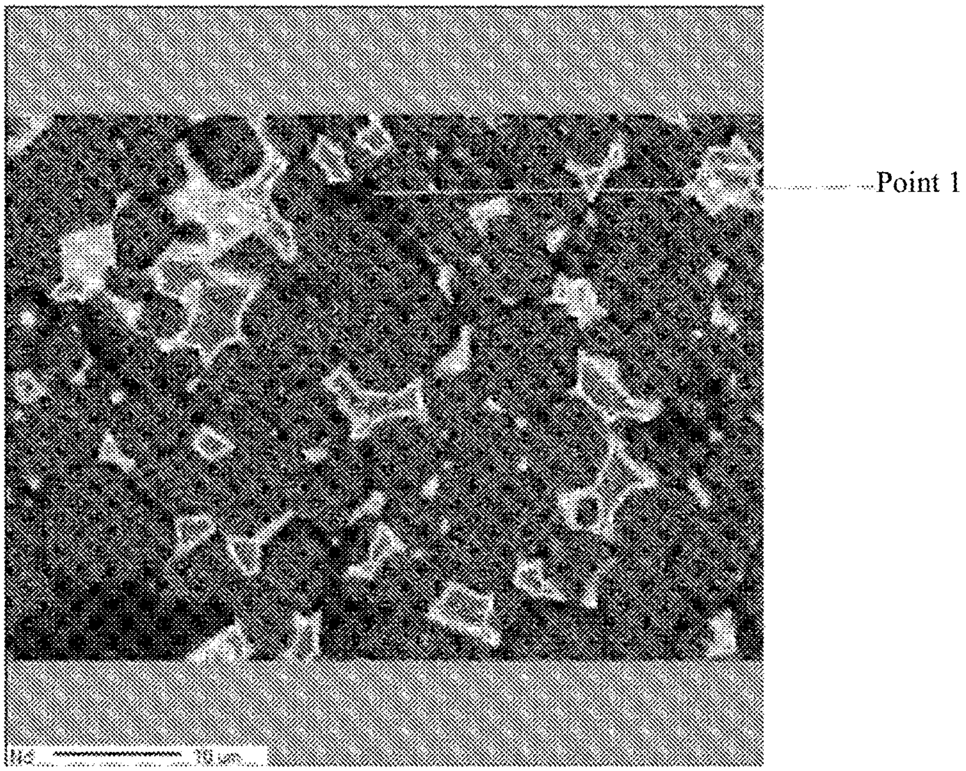
Point 1

R-T-B SERIES PERMANENT MAGNET MATERIAL, RAW MATERIAL COMPOSITION PREPARATION METHOD AND APPLICATION

The present application is a National Stage of International Application No. PCT/CN2020/100574, filed on Jul. 7, 2020, which claims priority of the Chinese Patent Application No. CN201911418433.8 filed on Dec. 31, 2019, the contents of which are incorporated herein by reference in their entireties.

TECHNICAL FIELD

The present disclosure relates to an R-T-B series permanent magnet material, a raw material composition, a preparation method, and an application.

BACKGROUND

Permanent magnet materials have been developed as key materials to support electronic devices, and the development is in the direction of high magnetic energy product and high coercivity. R-T-B series permanent magnet materials (where R is at least one of the rare earth elements) are known as magnets with the highest performance among permanent magnets, and are used in various motors and home appliances such as voice coil motors (VCM) for hard disk drives, motors for electric vehicles (EV, HV, PHV etc.), and motors for industrial equipment.

In order to improve the remanence (abbreviated as Br) of an R-T-B series permanent magnet material, it is usually necessary to reduce the content of B; however, when the content of B is less than 5.88 at %, it can be seen from an Nd—Fe—B ternary phase diagram that $R_2T_{17}$ is easily formed, which $R_2T_{17}$ does not have room temperature uniaxial anisotropy, leading to reduced magnet performance. In the prior art, a high amount of one or more of Cu, Al and Ga is added thereto to generate $R_6$-$T_{13}$-X (X refers to Cu, Al and/or Ga) in order to improve the performance; however, $R_6$-$T_{13}$-X is relatively sensitive to heat treatment temperature and time (as described in WO 2013008756 and WO 0124203), and during bulk treatment in a large heat treatment furnace, the performance of the permanent magnet material varies greatly depending on the loading position, which is not conducive to mass production.

Therefore, there is an urgent need for an R-T-B series permanent magnet material that has not only a guaranteed magnetic performance but also facilitates mass production.

CONTENT OF THE PRESENT INVENTION

The technical problem to be solved by the present disclosure is to provide an R-T-B series permanent magnet material, a raw material composition, a preparation method, and an application thereof, in order to overcome the deficiency in existing R-T-B series permanent magnet materials that when the content of B is less than 5.88 at %, the generation of $R_6$-$T_{13}$-X in order to improve magnetic performance results in a magnet being sensitive to heat treatment temperature and time, which is not conducive to mass production of an R-T-B series permanent magnet material with an excellent magnetic performance.

The present disclosure provides an R-T-B series permanent magnet material, comprising, by mass percentage, the following components:

29-31.0 wt. % of R, greater than 1 wt. % of RH, 0.905-0.945 wt. % of B, 0.04-0.15 wt. % of C, 0.1-0.4 wt. % of Q, 67-69 wt. % of Fe, wherein wt. % refers to the mass percentage relative to the R-T-B series permanent magnet material;

the R-T-B series permanent magnet material further comprises Co and Ti;

Q includes Cu and/or Ga;

R includes RL and RH, wherein RL is a light rare earth element, including at least Nd, and RH is a heavy rare earth element;

an $(RL_{1-y}RH_y)_2T_{17}C_x$ phase is present at the grain boundary of the R-T-B series permanent magnet material, wherein x is 2-3, y is 0.15-0.35, and T necessarily includes Fe, and also includes one or more of Co, Ti and Q.

In the present disclosure, the type of RH may include one or more of Gd, Tb, Dy, Ho, Er, Tm, Yb, Lu, Y, and Sc.

In the present disclosure, the type of RL may include one or more of La, Ce, Pr, Pm, Sm, and Eu.

In the present disclosure, the grain boundary of the R-T-B series permanent magnet material refers to the position between adjacent two or more main phase crystal grains.

In the present disclosure, the R-T-B series permanent magnet material may further comprise M, and M includes one or more of the elements Al, Si, Sn, Ge, Ag, Au, Bi, Mn, Cr, Zr, Nb, and Hf.

Among them, the range of the content of M is preferably 0-3 wt. %, wherein wt. % refers to the mass percentage relative to the R-T-B series permanent magnet material.

In the present disclosure, when Q includes Cu, the range of the content of Cu is preferably 0.05-0.20 wt. %, e.g. 0.12 wt. %, 0.08 wt. % or 0.15 wt. %, wherein wt. % refers to the mass percentage relative to the R-T-B series permanent magnet material.

In the present disclosure, when Q includes Ga, the range of the content of Ga is preferably 0.05-0.20 wt. %, e.g. 0.12 wt. %, 0.12 wt. % or 0.1 wt. %, wherein wt. % refers to the mass percentage relative to the R-T-B series permanent magnet material.

In the present disclosure, the R-T-B series permanent magnet material may further comprise 0, and the range of the content of 0 may be 0.08-0.12 wt. %, e.g. 0.09 or 0.1 wt. %, wherein wt. % refers to the mass percentage relative to the R-T-B series permanent magnet material.

In the present disclosure, in the $(RL_{1-y}RH_y)_2Ti_7C_x$ phase, x may be 2-2.8, e.g. 2.6 or 2.7. y may be 0.15-0.3, e.g. 0.18, 0.22, 0.23 or 0.28. For example, the $(RL_{1-y}RH_y)_2T_{17}C_x$ phase is $(RL_{0.77}RH_{0.23})_2$-$T_{17}$-$C_{2.7}$, $(RL_{0.78}RH_{0.22})_2$-$T_{17}$-$C_{2.6}$, $(RL_{0.77}RH_{0.23})_2$-$T_{17}$-$C_{2.8}$, $(RL_{0.81}RH_{0.18})_2$-$T_{17}$-$C_{2.7}$, or $(RL_{0.72}RH_{0.28})_2$-$T_{17}$-$C_{2.8}$.

In the present disclosure, preferably, the range of the content of R is 30.2-31.0 wt. % or 29-30.4 wt. %, e.g. 30 wt. %, 30.4 wt. % or 31 wt. %, wherein wt. % refers to the mass percentage relative to the R-T-B series permanent magnet material.

In the present disclosure, preferably, the type of RH includes Dy and/or Tb.

In the present disclosure, preferably, the range of the content of RH is 1-2.5 wt. %, exclusive of 1 wt. %, e.g. 1.9 wt. %, 2 wt. % or 1.5 wt. %, wherein wt. % refers to the mass percentage relative to the R-T-B series permanent magnet material.

In the present disclosure, preferably, the range of the content of B is 0.905-0.93 wt. %, e.g. 0.93 wt. %, 0.905 wt. % or 0.915 wt. %, wherein wt. % refers to the mass percentage relative to the R-T-B series permanent magnet material.

In the present disclosure, preferably, the range of the content of C is 0.1-0.15 wt. % or 0.04-0.12 wt. %, e.g. 0.12 wt. %, 0.07 wt. % or 0.1 wt. %, wherein wt. % refers to the mass percentage relative to the R-T-B series permanent magnet material.

In the present disclosure, the content of Ti may be a conventional amount in the art. Preferably, the range of the content of Ti is 0.05-0.2 wt. % or 0.1-0.25 wt. %, e.g. 0.16 wt. %, 0.08 wt. % or 0.1 wt. %, wherein wt. % refers to the mass percentage relative to the R-T-B series permanent magnet material.

In the present disclosure, the content of Co may be a conventional amount in the art. Preferably, the range of the content of Co is 0.5-1.5 wt. % or 1-2 wt. %, e.g. 0.8 wt. %, 1.2 wt. %, 1 wt. % or 1.5 wt. %, wherein wt. % refers to the mass percentage relative to the R-T-B series permanent magnet material.

In a preferred embodiment of the present disclosure, the R-T-B series permanent magnet material comprises, by mass percentage, the following components: 30.2-31.0 wt. % of R, 1-2.5 wt. % of RH, 0.905-0.93 wt. % of B, 0.1-0.15 wt. % of C, 0.05-0.2 wt. % of Ti, 0.5-1.5 wt. % of Co, and 0.08-0.12 wt. % of O, wherein wt. % refers to the mass percentage relative to the R-T-B series permanent magnet material, and the balance is Fe and inevitable impurities.

In a preferred embodiment of the present disclosure, the R-T-B series permanent magnet material comprises, by mass percentage, the following components: 29-30.4 wt. % of R, 1-2.5 wt. % of RH, 0.905-0.93 wt. % of B, 0.04-0.12 wt. % of C, 0.1-0.25 wt. % of Ti, 1-2 wt. % of Co, and 0.08-0.12 wt. % of O, wherein wt. % refers to the mass percentage relative to the R-T-B series permanent magnet material, and the balance is Fe and inevitable impurities.

In a preferred embodiment of the present disclosure, the R-T-B series permanent magnet material comprises, by mass percentage, the following components: 28.5 wt. % of Nd, 0.6 wt. % of Dy, 1.3 wt. % of Tb, 0.93 wt. % of B, 0.12 wt. % of C, 0.12 wt. % of Cu, 0.12 wt. % of Ga, 0.16 wt. % of Ti, 0.8 wt. % of Co, and 0.08 wt. % of O, wherein wt. % refers to the mass percentage relative to the R-T-B series permanent magnet material, and the balance is Fe and inevitable impurities.

In a preferred embodiment of the present disclosure, the R-T-B series permanent magnet material comprises, by mass percentage, the following components: 29 wt. % of PrNd, 1.5 wt. % of Dy, 0.5 wt. % of Tb, 0.905 wt. % of B, 0.04 wt. % of C, 0.2 wt. % of Cu, 0.2 wt. % of Ga, 0.08 wt. % of Ti, 1.2 wt. % of Co, and 0.09 wt. % of O, wherein wt. % refers to the mass percentage relative to the R-T-B series permanent magnet material, and the balance is Fe and inevitable impurities.

In a preferred embodiment of the present disclosure, the R-T-B series permanent magnet material comprises, by mass percentage, the following components: 27.5 wt. % of Nd, 1 wt. % of Dy, 0.5 wt. % of Tb, 0.945 wt. % of B, 0.15 wt. % of C, 0.05 wt. % of Cu, 0.12 wt. % of Ga, 0.05 wt. % of Ti, 1 wt. % of Co, and 0.1 wt. % of O, wherein wt. % refers to the mass percentage relative to the R-T-B series permanent magnet material, and the balance is Fe and inevitable impurities.

In a preferred embodiment of the present disclosure, the R-T-B series permanent magnet material comprises, by mass percentage, the following components: 29.5 wt. % of PrNd, 1 wt. % of Dy, 0.5 wt. % of Tb, 0.905 wt. % of B, 0.07 wt. % of C, 0.08 wt. % of Cu, 0.1 wt. % of Ga, 0.1 wt. % of Ti, 1.5 wt. % of Co, and 0.12 wt. % of O, wherein wt. % refers to the mass percentage relative to the R-T-B series permanent magnet material, and the balance is Fe and inevitable impurities.

In a preferred embodiment of the present disclosure, the R-T-B series permanent magnet material comprises, by mass percentage, the following components: 28.5 wt. % of Nd, 1 wt. % of Dy, 0.5 wt. % of Tb, 0.915 wt. % of B, 0.1 wt. % of C, 0.15 wt. % of Cu, 0.05 wt. % of Ga, 0.2 wt. % of Ti, 2 wt. % of Co, and 0.1 wt. % of O, wherein wt. % refers to the mass percentage relative to the R-T-B series permanent magnet material, and the balance is Fe and inevitable impurities.

The present disclosure further provides a raw material composition for an R-T-B series permanent magnet material, comprising, by mass percentage, the following components:

28.5-30.5 wt. % of R,
0.905-0.945 wt. % of B,
0.1-0.4 wt. % of Q,
67-69 wt. % of Fe,
wt. % refers to the mass percentage relative to the raw material composition for the R-T-B series permanent magnet material;
wherein the raw material composition for the R-T-B series permanent magnet material comprises Ti and Co;
Q includes Cu and/or Ga;
R includes RL and RH, wherein RL is a rare earth element, including at least Nd, and RH is a heavy rare earth element.

In the present disclosure, when Q includes Cu, the range of the content of Cu is preferably 0.05-0.20 wt. %, e.g. 0.12 wt. %, 0.08 wt. % or 0.15 wt. %, wherein wt. % refers to the mass percentage relative to the raw material composition for the R-T-B series permanent magnet material.

In the present disclosure, when Q includes Ga, the range of the content of Ga is preferably 0.05-0.20 wt. %, e.g. 0.12 wt. %, 0.12 wt. % or 0.1 wt. %, wherein wt. % refers to the mass percentage relative to the raw material composition for the R-T-B series permanent magnet material.

In the present disclosure, preferably, the range of the content of R is 29.7-30.5 wt. % or 28.5-29.9 wt. %, e.g. 29.5 wt. %, 29.9 wt. % or 30.5 wt. %, wherein wt. % refers to the mass percentage relative to the raw material composition for the R-T-B series permanent magnet material.

In the present disclosure, preferably, the type of RH includes Dy and/or Tb.

In the present disclosure, preferably, the range of the content of RH is 0.5-2 wt. %, exclusive of 0.5 wt. %, e.g. 1.4 wt. %, 1.5 wt. % or 1 wt. %, wherein wt. % refers to the mass percentage relative to the raw material composition for the R-T-B series permanent magnet material.

In the present disclosure, preferably, the range of the content of B is 0.905-0.93 wt. %, e.g. 0.93 wt. %, 0.905 wt. % or 0.915 wt. %, wherein wt. % refers to the mass percentage relative to the raw material composition for the R-T-B series permanent magnet material.

In the present disclosure, preferably, the range of the content of Ti is 0.05-0.2 wt. % or 0.1-0.25 wt. %, e.g. 0.16 wt. %, 0.08 wt. % or 0.1 wt. %, wherein wt. % refers to the mass percentage relative to the raw material composition for the R-T-B series permanent magnet material.

In the present disclosure, preferably, the range of the content of Co is 0.5-1.5 wt. % or 1-2 wt. %, e.g. 0.8 wt. %, 1.2 wt. %, 1 wt. % or 1.5 wt. %, wherein wt. % refers to the mass percentage relative to the raw material composition for the R-T-B series permanent magnet material.

In a preferred embodiment of the present disclosure, the raw material composition for the R-T-B series permanent magnet material, by mass percentage, comprises the following components: 29.7-30.5 wt. % of R, 0.5-2 wt. % of RH, 0.905-0.93 wt. % of B, 0.1-0.15 wt. % of C, 0.05-0.2 wt. % of Ti, and 0.5-1.5 wt. % of Co, wherein wt. % refers to the mass percentage relative to the raw material composition for the R-T-B series permanent magnet material, and the balance is Fe and inevitable impurities.

In a preferred embodiment of the present disclosure, the raw material composition for the R-T-B series permanent magnet material, by mass percentage, comprises the following components: 28.5-29.9 wt. % of R, 0.5-2 wt. % of RH, 0.905-0.93 wt. % of B, 0.04-0.12 wt. % of C, 0.1-0.25 wt. % of Ti, and 1-2 wt. % of Co, wherein wt. % refers to the mass percentage relative to the raw material composition for the R-T-B series permanent magnet material, and the balance is Fe and inevitable impurities.

In a preferred embodiment of the present disclosure, the raw material composition for the R-T-B series permanent magnet material, by mass percentage, comprises the following components: 28.5 wt. % of Nd, 0.1 wt. % of Dy, 1.3 wt. % of Tb, 0.93 wt. % of B, 0.12 wt. % of C, 0.12 wt. % of Cu, 0.12 wt. % of Ga, 0.16 wt. % of Ti, and 0.8 wt. % of Co, wherein wt. % refers to the mass percentage relative to the raw material composition for the R-T-B series permanent magnet material, and the balance is Fe and inevitable impurities.

In a preferred embodiment of the present disclosure, the raw material composition for the R-T-B series permanent magnet material, by mass percentage, comprises the following components: 29 wt. % of PrNd, 1.5 wt. % of Dy, 0.905 wt. % of B, 0.04 wt. % of C, 0.2 wt. % of Cu, 0.2 wt. % of Ga, 0.08 wt. % of Ti, and 1.2 wt. % of Co, wherein wt. % refers to the mass percentage relative to the raw material composition for the R-T-B series permanent magnet material, and the balance is Fe and inevitable impurities.

In a preferred embodiment of the present disclosure, the raw material composition for the R-T-B series permanent magnet material, by mass percentage, comprises the following components: 27.5 wt. % of Nd, 0.5 wt. % of Dy, 0.5 wt. % of Tb, 0.945 wt. % of B, 0.15 wt. % of C, 0.05 wt. % of Cu, 0.12 wt. % of Ga, 0.05 wt. % of Ti, and 1 wt. % of Co, wherein wt. % refers to the mass percentage relative to the raw material composition for the R-T-B series permanent magnet material, and the balance is Fe and inevitable impurities.

In a preferred embodiment of the present disclosure, the raw material composition for the R-T-B series permanent magnet material, by mass percentage, comprises the following components: 29.5 wt. % of PrNd, 0.5 wt. % of Dy, 0.5 wt. % of Tb, 0.905 wt. % of B, 0.07 wt. % of C, 0.08 wt. % of Cu, 0.1 wt. % of Ga, 0.1 wt. % of Ti, and 1.5 wt. % of Co, wherein wt. % refers to the mass percentage relative to the raw material composition for the R-T-B series permanent magnet material, and the balance is Fe and inevitable impurities.

In a preferred embodiment of the present disclosure, the raw material composition for the R-T-B series permanent magnet material, by mass percentage, comprises the following components: 28.5 wt. % of Nd, 0.5 wt. % of Dy, 0.5 wt. % of Tb, 0.915 wt. % of B, 0.1 wt. % of C, 0.15 wt. % of Cu, 0.05 wt. % of Ga, 0.2 wt. % of Ti, and 2 wt. % of Co, wherein wt. % refers to the mass percentage relative to the raw material composition for the R-T-B series permanent magnet material, and the balance is Fe and inevitable impurities.

The present disclosure further provides a method for preparing an R-T-B series permanent magnet material, comprising the following step: subjecting a melt of the raw material composition for the R-T-B series permanent magnet material to casting, crushing, pulverization, forming, sintering, a grain boundary diffusion treatment, and a heat treatment.

In the present disclosure, the melt of the raw material composition for the R-T-B series permanent magnet material can be prepared by means of a conventional method in the art, e.g. by smelting in a high-frequency vacuum induction smelting furnace. The degree of vacuum in the smelting furnace may be $5\times10^{-2}$ Pa. The smelting temperature may be 1500° C. or less.

In the present disclosure, the casting process may be a conventional casting process in the art, e.g. cooling at a rate of $10^2$ to $10^4$° C./sec in an Ar atmosphere, e.g. in an Ar atmosphere of $5.5\times10^4$ Pa.

In the present disclosure, the crushing process may be a conventional crushing process in the art, e.g. hydrogen absorption, dehydrogenation, and cooling treatment.

The hydrogen absorption may be carried out under the condition of a hydrogen pressure of 0.15 MPa.

The dehydrogenation may be carried out under the condition of evacuation while heating.

In the present disclosure, the pulverization process may be a conventional pulverization process in the art, e.g. jet mill pulverization.

Preferably, the pulverization process is carried out in an atmosphere with an oxidizing gas content of 100 ppm or less. The oxygen content in the pulverization process is controlled according to a conventional low-oxygen process in the art.

The oxidizing gas refers to oxygen or moisture content.

The pressure in a pulverization chamber for the jet mill pulverization may be 0.38 MPa.

The time for the jet mill pulverization may be 3 hours.

After pulverization, a lubricant, such as zinc stearate, may be added by a conventional means in the art. The lubricant may be added in an amount of 0.05-0.15%, e.g. 0.12%, 0.06%, 0.15% or 0.08%, relative to the weight of the pulverized powder.

During the pulverization process, the content of C in the R-T-B series permanent magnet material may be adjusted by adjusting the added amount of zinc stearate.

In the present disclosure, the forming process may be a conventional forming process in the art, e.g. a magnetic field forming method or a hot pressing thermal deformation method.

In the present disclosure, the sintering process may be a conventional sintering process in the art, e.g. preheating, sintering, and cooling under vacuum condition, e.g. in a vacuum of $5\times10^{-3}$ Pa.

The preheating temperature may be 300-600° C. The preheating time may be 1-2 h. Preferably, the preheating is carried out at 300° C. and 600° C., each for 1 h.

The sintering temperature may be a conventional sintering temperature in the art, e.g. 900-1100° C., further 1040° C.

The sintering time may be a conventional sintering time in the art, e.g. 2 h.

Before cooling, Ar gas may be introduced to make the gas pressure reach 0.1 MPa.

In the present disclosure, the heavy rare earth element in the grain boundary diffusion treatment includes Dy and/or Tb.

In the present disclosure, the grain boundary diffusion treatment may be carried out according to a conventional process in the art, e.g. Dy vapor diffusion.

The temperature of the grain boundary diffusion treatment may be 800-900° C., e.g. 850° C.

The time for the grain boundary diffusion treatment may be 12-48 h, e.g. 24 h.

After the grain boundary diffusion treatment, a heat treatment may be further carried out. The heat treatment temperature may be 470-510° C., 460-500° C., or 480-520° C. The time for the heat treatment may be 3 h.

The present disclosure further provides an R-T-B series permanent magnet material prepared by the above-mentioned preparation method.

The present disclosure further provides the use of the R-T-B series permanent magnet material as an electronic component.

On basis of conforming to common knowledge in the art, the above-mentioned preferred conditions can be arbitrarily combined to obtain various preferred embodiments of the present disclosure.

The reagents and raw materials used in the present disclosure are all commercially available.

The positive progressive effects of the present disclosure lie in:

1) the R-T-B series permanent magnet material of the present application has an excellent performance, maintains relatively high Br and Hcj at various heat treatment temperatures: Br≥13.92 kGs and Hcj≥25.7 kOe;

2) the R-T-B series permanent magnet material of the present application has wider heat treatment temperature ranges, all with an interval of 40° C. (470-510° C., 460-500° C., and 480-520° C.).

BRIEF DESCRIPTION OF THE DRAWINGS

FIG. 1 is an FE-EPMA surface distribution diagram of the element Nd in the R-T-B series permanent magnet material prepared in Example 1, wherein point 1 is $(RL_{0.77}RH_{0.23})_2\text{-}T_{17}\text{-}C_{2.7}$.

DETAILED DESCRIPTION OF THE PREFERRED EMBODIMENT

The present disclosure is further described below by way of examples; however, the present disclosure is not limited to the scope of the described examples. For the experimental methods in which no specific conditions are specified in the following examples, selections are made according to conventional methods and conditions or according to the product instructions.

TABLE 1

Formula of raw material composition for R-T-B series permanent magnet material and contents (wt. %)

| | | RL | | RH | | | | | | | | | |
|---|---|---|---|---|---|---|---|---|---|---|---|---|---|
| No. | R | PrNd | Nd | Dy | Tb | B | Cu | Ga | Ti | Fe | Zr | Nb | Co |
| Example 1 | 29.8 | / | 28.5 | 0 | 1.3 | 0.93 | 0.12 | 0.12 | 0.16 | 68.07 | / | / | 0.8 |
| Example 2 | 30.5 | 29 | / | 1.5 | 0 | 0.905 | 0.2 | 0.2 | 0.08 | 66.92 | / | / | 1.2 |
| Example 3 | 28.5 | / | 27.5 | 1 | 0 | 0.945 | 0.05 | 0.12 | 0.05 | 69.34 | / | / | 1 |
| Example 4 | 30.5 | 29.5 | / | 1 | 0 | 0.905 | 0.08 | 0.1 | 0.1 | 66.82 | / | / | 1.5 |
| Example 5 | 29.5 | / | 28.5 | 1 | 0 | 0.915 | 0.15 | 0.05 | 0.2 | 67.19 | / | / | 2 |
| Comparative Example 1 | 31 | 30 | / | 1 | 0 | 0.96 | 0.08 | 0.07 | 0.1 | 66.79 | / | / | 1 |
| Comparative Example 2 | 30.1 | 29.1 | / | 1 | 0 | 0.89 | 0.04 | 0.03 | 0.1 | 67.84 | / | / | 1 |
| Comparative Example 3 | 30.4 | 29.4 | / | 1 | 0 | 0.97 | 0.25 | 0.3 | 0.1 | 66.98 | / | / | 1 |
| Comparative Example 4 | 29 | / | 28 | 1 | 0 | 0.945 | 0.05 | 0.25 | 0.02 | 68.74 | / | / | 1 |
| Comparative Example 5 | 28.5 | / | 27.5 | 1 | 0 | 0.945 | 0.05 | 0.12 | 0.05 | 69.35 | / | / | 1 |
| Comparative Example 6 | 30.5 | 29 | / | 1.5 | 0 | 0.905 | 0.2 | 0.2 | / | 67.12 | 0.08 | / | 1 |
| Comparative Example 7 | 30.5 | 29 | / | 1.5 | 0 | 0.905 | 0.2 | 0.2 | / | 67.12 | / | 0.08 | 1 |

Note:
"/" refers to being free of the element.

TABLE 2

Process conditions for Examples 1-5 and Comparative Examples 1-7

| No. | Zinc stearate (%) | Does grain boundary diffusion occur? | Grain boundary diffused heavy rare earth element | Heat treatment temperature (° C.) |
|---|---|---|---|---|
| Example 1 | 0.12% | Yes | Dy | 470-510 |
| Example 2 | 0.06% | Yes | Tb | 460-500 |
| Example 3 | 0.15% | Yes | Tb | 480-520 |
| Example 4 | 0.08% | Yes | Tb | 480-520 |
| Example 5 | 0.08% | Yes | Tb | 460-500 |
| Comparative Example 1 | 0.08% | Yes | Tb | 480-500 |
| Comparative Example 2 | 0.08% | Yes | Tb | 460-470 |
| Comparative Example 3 | 0.08% | Yes | Tb | 480-500 |
| Comparative Example 4 | 0.2% | Yes | Tb | 480-490 |
| Comparative Example 5 | 0.16% | No | / | 480-490 |
| Comparative Example 6 | 0.06% | Yes | Tb | 480-500 |
| Comparative Example 7 | 0.06% | Yes | Tb | 480-500 |

Note:
% with regard to zinc stearate refers to the mass percentage in the powder after mixing;
"/" refers to being free of the element.

The Preparation Method for the R-T-B Series Permanent Magnet Materials in Examples 1-5 and Comparative Examples 1-7 was as Follows:

(1) Smelting process: According to the formula shown in Table 1 and the corresponding process conditions in Table 2, the prepared raw materials were placed in a crucible made of aluminum oxide, and vacuum smelting was carried out in a high-frequency vacuum induction smelting furnace in a vacuum of $5\times10^{-2}$ Pa at a temperature of 1500° C. or lower.

(2) Casting process: Ar gas was introduced into the smelting furnace after vacuum smelting to make the gas pressure reach 55,000 Pa, casting was then carried out, and a quenched alloy was obtained at a cooling rate of $10^2$ to $10^4$° C./sec.

(3) Hydrogen-decrepitation-based pulverization process: A hydrogen decrepitation furnace, in which the quenched alloy was placed, was evacuated at room temperature, hydrogen with a purity of 99.9% was then introduced into the hydrogen decrepitation furnace, and the hydrogen pressure was maintained at 0.15 MPa; after full hydrogen absorption, the furnace was heated up while being evacuated, and full dehydrogenation was carried out; after cooling, a powder pulverized by hydrogen decrepitation was taken out.

(4) Micro-pulverization process: The powder pulverized by hydrogen decrepitation was subjected to jet mill pulverization for 3 hours under the conditions of an oxidizing gas content of 100 ppm or less in a nitrogen atmosphere and a pulverization chamber pressure of 0.38 MPa to obtain a fine powder. The oxidizing gas referred to oxygen or moisture.

(5) Zinc stearate was added to the powder resulting from jet mill pulverization in an amount as shown in Table 2, and then fully mixed by means of a V-type mixer.

(6) Magnetic field forming process: The above-mentioned powder, to which zinc stearate had been added, was subjected to primary formation into a cube with a side length of 25 mm by means of a right-angle alignment magnetic field forming machine in a 1.6 T alignment magnetic field at a forming pressure of 0.35 ton/cm$^2$, and after the primary formation, the powder was demagnetized in a 0.2 T magnetic field. The formed body resulting from primary formation was sealed so that it did not come into contact with air, and secondary formation was then carried out at a pressure of 1.3 ton/cm$^2$ by means of a secondary formation machine (an isostatic pressing machine).

(7) Sintering process: Each formed body was moved to a sintering furnace for sintering in a vacuum of $5\times10^{-3}$ Pa and at temperatures of 300° C. and 600° C., each for 1 hour, and then for sintering at a temperature of 1040° C. for 2 hours, Ar gas was then introduced to make the gas pressure reach 0.1 MPa, and the formed body was then cooled to room temperature.

(8) Grain boundary diffusion treatment process: The metal Dy or Tb and the sintered R-T-B series permanent magnet material were placed in a furnace and heated at a high temperature, such that the metal Dy or Tb was evaporated at the high temperature, deposited on the surface of the magnet under the induction of a foreign rare gas, and diffused into the interior of the magnet along the grain boundaries (specifically according to the conditions shown in Table 2).

(9) Heat treatment process: The sintered body was heat treated for 3 hours in high-purity Ar gas at the heat treatment temperature shown in Table 2, then cooled to room temperature, and then taken out to obtain the R-T-B series permanent magnet material.

Effect Example

The R-T-B series permanent magnet materials prepared in Examples 1-5 and Comparative Examples 1-7 were separately taken to measure the magnetic performance and compositions thereof, and the phase compositions of the magnets thereof were observed by means of FE-EPMA.

(1) The compositions of the R-T-B series permanent magnet materials were measured using a high-frequency inductively coupled plasma optical emission spectrometer (ICP-OES), wherein an $(RL_{1-y}RH_y)_2Ti_7C_x$ (x: 2-3, and y: 0.15-0.35) phase was obtained according to an FE-EPMA test. Table 3 below showed the composition test results.

TABLE 3

Composition of R-T-B series permanent magnet material and contents (wt. %)

| | | RL | | RH | | | | | | | | | | | | Is $(RL_{1-y}RH_y)_2T_{17}C_x$ |
|---|---|---|---|---|---|---|---|---|---|---|---|---|---|---|---|---|
| No. | R | PcNd | Nd | Dy | Tb | B | C | Cu | Ga | Ti | Fe | Zr | Nb | Co | O | phase generated? |
| Example 1 | 30.4 | / | 28.5 | 0.6 | 1.3 | 0.93 | 0.12 | 0.12 | 0.12 | 0.16 | 67.27 | / | / | 0.8 | 0.08 | Yes |
| Example 2 | 31 | 29 | / | 1.5 | 0.5 | 0.905 | 0.04 | 0.2 | 0.2 | 0.08 | 66.29 | / | / | 1.2 | 0.09 | Yes |
| Example 3 | 29 | / | 27.5 | 1 | 0.5 | 0.945 | 0.15 | 0.05 | 0.12 | 0.05 | 68.59 | / | / | 1 | 0.1 | Yes |
| Example 4 | 31 | 29.5 | / | 1 | 0.5 | 0.905 | 0.07 | 0.08 | 0.1 | 0.1 | 66.13 | / | / | 1.5 | 0.12 | Yes |
| Example 5 | 30 | / | 28.5 | 1 | 0.5 | 0.915 | 0.1 | 0.15 | 0.05 | 0.2 | 66.49 | / | / | 2 | 0.1 | Yes |
| Comparative Example 1 | 31.5 | 30 | / | 1 | 0.5 | 0.96 | 0.07 | 0.08 | 0.07 | 0.1 | 66.14 | / | / | 1 | 0.08 | Yes |
| Comparative Example 2 | 30.6 | 29.1 | / | 1 | 0.5 | 0.89 | 0.07 | 0.04 | 0.03 | 0.1 | 67.19 | / | / | 1 | 0.08 | No |
| Comparative Example 3 | 30.9 | 29.4 | / | 1 | 0.5 | 0.97 | 0.07 | 0.25 | 0.3 | 0.1 | 66.33 | / | / | 1 | 0.08 | No |
| Comparative Example 4 | 29.5 | / | 28 | 1 | 0.5 | 0.945 | 0.2 | 0.05 | 0.25 | 0.02 | 67.92 | / | / | 1 | 0.12 | No |
| Comparative Example 5 | 28.5 | / | 27.5 | 1 | 0.5 | 0.945 | 0.15 | 0.05 | 0.12 | 0.05 | 68.57 | / | / | 1 | 0.12 | No |
| Comparative Example 6 | 31 | 29 | / | 1.5 | 0.5 | 0.905 | 0.04 | 0.2 | 0.2 | / | 66.49 | 0.08 | / | 1 | 0.09 | No |
| Comparative Example 7 | 31 | 29 | / | 1.5 | 0.5 | 0.905 | 0.04 | 0.2 | 0.2 | / | 66.49 | / | 0.08 | 1 | 0.09 | No |

Note:
The above-mentioned permanent magnet materials were all prepared under the process conditions with an oxygen content of 100 ppm or less, and the difference in the O content in the final product could be regarded as a regular fluctuation;
Note:
"/" referred to being free of the element.

(2) FE-EPMA detection: A vertical alignment plane of the permanent magnet material was polished, and detected by means of a field emission-electron probe micro-analyser (FE-EPMA) (JEOL, 8530F). Surface scanning was firstly performed, and phases with different contrasts were then quantitatively analyzed to determine the phase composition, wherein the test conditions were an accelerating voltage of 15 kV and a probe beam current of 50 nA.

FE-EPMA detection was carried out on the R-T-B series permanent magnet materials prepared in Examples 1-5, and the results were as shown in Table 4 below, wherein FIG. 1 corresponded to the R-T-B series permanent magnet material prepared in Example 1 (wherein the composition of point 1 was as shown in Table 4 with respect to Example 1).

TABLE 4

| | R | | | | T | | | | | C | |
|---|---|---|---|---|---|---|---|---|---|---|---|
| No. | Nd | Pr | Tb | Dy | Fe | Co | Ga | Cu | Ti | C | Phase composition |
| Example 1 | 7.11 | 0 | 0.2 | 1.9 | 76.83 | 1.32 | 0.02 | 0.08 | 0.01 | 12.21 | $(RL_{0.77}RH_{0.23})_2$-$T_{17}$-$C_{2.7}$ |
| Example 2 | 5.92 | 1.3 | 1.7 | 0.3 | 76.94 | 1.52 | 0.05 | 0.1 | 0.02 | 12.15 | $(RL_{0.78}RH_{0.22})_2$-$T_{17}$-$C_{2.6}$ |
| Example 3 | 7.06 | 0 | 1.89 | 0.2 | 76.36 | 1.48 | 0.03 | 0.07 | 0.02 | 12.89 | $(RL_{0.77}RH_{0.23})_2$-$T_{17}$-$C_{2.8}$ |
| Example 4 | 5.88 | 1.6 | 1.5 | 0.2 | 76.51 | 1.65 | 0.06 | 0.02 | 0.05 | 12.53 | $(RL_{0.81}RH_{0.18})_2$-$T_{17}$-$C_{2.7}$ |
| Example 5 | 6.58 | 0 | 2.4 | 0.2 | 76.51 | 1.52 | 0.02 | 0.06 | 0.04 | 12.67 | $(RL_{0.72}RH_{0.28})_2$-$T_{17}$-$C_{2.8}$ |

(3) Magnetic performance evaluation: The permanent magnet material was tested for magnetic performance by NIM-10000H BH bulk rare earth permanent magnet non-destructive measurement system from The National Institute of Metrology of China, and the magnetic performance test results were as shown in Table 5 below. In Table 5, "Br" referred to residual magnetic flux density, "Hcj" referred to intrinsic coercivity, "BHmax" referred to maximum energy product, and "BHH" referred to the sum of BHmax and Hcj.

TABLE 5

Performance of R-T-B series permanent magnet materials

| No. | Br (kGs) | Hcj (kOe) | BHmax (MGOe) | BHH | Heat treatment temperature (° C.) |
|---|---|---|---|---|---|
| Example 1 | 14.05 | 26.5 | 47.4 | 73.9 | 470-510 |
| Example 2 | 13.92 | 28.3 | 46.4 | 74.7 | 460-500 |
| Example 3 | 14.31 | 25.7 | 49.2 | 74.9 | 480-520 |
| Example 4 | 13.98 | 27.1 | 47.0 | 74.1 | 480-520 |
| Example 5 | 14.02 | 26.6 | 47.1 | 73.7 | 460-500 |
| Comparative Example 1 | 13.51 | 26.8 | 43.7 | 70.5 | 480-500 |
| Comparative Example 2 | 14.03 | 25.8 | 47.1 | 72.9 | 460-470 |
| Comparative Example 3 | 13.58 | 27.0 | 44.1 | 71.1 | 480-500 |
| Comparative Example 4 | 14.28 | 24.1 | 48.9 | 73.0 | 480-490 |
| Comparative Example 5 | 14.33 | 17.5 | 49.1 | 66.6 | 480-490 |
| Comparative Example 6 | 13.88 | 26.4 | 46.1 | 72.5 | 480-500 |
| Comparative Example 7 | 13.81 | 26.8 | 45.6 | 72.4 | 480-500 |

As can be seen from Table 5, 1) the R-T-B series permanent magnet material of the present application has an excellent performance, maintains relatively high Br and Hcj at various heat treatment temperatures: Br≥13.92 kGs and Hcj≥25.7 kOe (Examples 1-5);

2) based on the formula of the present application, even if the contents of R, B, Cu, and Ga are adjusted, no $(RL_{1-y}RH_y)_2T_{17}C_x$ (x: 2-3, and y: 0.15-0.35) phase can be generated, the Br and Hcj of the R-T-B series permanent magnet material cannot be both maintained at higher values, and the heat treatment temperature range is reduced significantly (Comparative Example 1 and Comparative Example 3);

3) based on the formula of the present application, even if the contents of C, Ti and Ga are adjusted, the Hcj of the R-T-B series permanent magnet material is reduced and at the same time the heat treatment temperature range will also decrease when the contents of the other compositions are not within the ranges defined in the present application (Comparative Example 4);

4) based on the formula of the present application, where the content of RH remains constant and no grain boundary diffusion is performed during preparation, no $(RL_{1-y}RH_y)_2T_{17}C_x$ (x: 2-3, and y: 0.15-0.35) phase can be generated without introduction of RH, the Hcj significantly decreases, and the heat treatment temperature range also decreases (Comparative Example 5);

5) based on the formula of the present application, where the high melting point metal Ti is replaced with Zr and Nb respectively and the content remains unchanged, the Br and Hcj of the R-T-B series permanent magnet material decrease, and the heat treatment temperature range also decreases (Comparative Examples 6 and 7).

What is claimed is:

1. An R-T-B series permanent magnet material, comprising, by mass percentage, the following components:

29-31.0 wt. % of R, greater than 1 wt. % of RH, 0.905-0.945 wt. % of B, 0.04-0.15 wt. % of C, 0.1-0.4 wt. % of Q, 67-69 wt. % of Fe, wherein wt. % refers to the mass percentage relative to the R-T-B series permanent magnet material;

the R-T-B series permanent magnet material further comprises Co and Ti;

Q includes Cu and/or Ga;

R includes RL and RH, wherein RL is a light rare earth element, including Nd, and RH is a heavy rare earth element;

an $(RL_{1-y}RH_y)_2T_{17}C_x$ phase is present at the grain boundary of the R-T-B series permanent magnet material, wherein x is 2-3, y is 0.15-0.35, and T necessarily includes Fe, and also includes one or more of Co, Ti and Q;

wherein the range of the content of Ti is 0.05-0.2 wt. % or 0.1-0.25 wt. %.

2. The R-T-B series permanent magnet material according to claim 1, wherein the R-T-B series permanent magnet material further comprises the element M, and the element M includes one or more of Al, Si, Sn, Ge, Ag, Au, Bi, Mn, Cr, Zr, Nb, and Hf.

3. The R-T-B series permanent magnet material according to claim 2, wherein the range of the content of M is 0-3 wt. %, exclusive of 0 wt. %.

4. The R-T-B series permanent magnet material according to claim 1, wherein the range of the content of R is 30.2-31.0 wt. % or 29-30.4 wt. %;

or, the range of the content of B is 0.905-0.93 wt. % or 0.915-0.945 wt. %.

5. The R-T-B series permanent magnet material according to claim 1, wherein, when Q includes Cu, the range of the content of Cu is 0.05-0.20 wt. %;

or, when Q includes Ga, the range of the content of Ga is 0.05-0.20 wt. %.

6. The R-T-B series permanent magnet material according to claim 1, wherein the R-T-B series permanent magnet material further comprises O, the range of the content of O is 0.08-0.12 wt. %.

7. The R-T-B series permanent magnet material according to claim 1, wherein the type of RH includes Dy and/or Tb.

8. The R-T-B series permanent magnet material according to claim 1, wherein the range of the content of RH is 1-2.5 wt. %, exclusive of 1 wt. %.

9. The R-T-B series permanent magnet material according to claim 1, wherein the range of the content of C is 0.1-0.15 wt. % or 0.04-0.12 wt. %.

10. A raw material composition for an R-T-B series permanent magnet material, comprising, by mass percentage, the following components:

28.5-30.5 wt. % of R, 0.905-0.945 wt. % of B, 0.1-0.4 wt. % of Q, 67-69 wt. % of Fe, wherein the raw material composition for the R-T-B series permanent magnet material comprises Ti and Co;

wt. % refers to the mass percentage relative to the raw material composition for the R-T-B series permanent magnet material;

Q includes Cu and/or Ga;

R includes RL and RH, wherein RL is a light rare earth element, including Nd, and RH is a heavy rare earth element;

an $(RL_{1-y}RH_y)_2T_{17}C_x$ phase is present at the grain boundary of the R-T-B series permanent magnet material, wherein x is 2-3, y is 0.15-0.35, and T necessarily includes Fe, and also includes one or more of Co, Ti and Q;

wherein, the range of the content of Ti is 0.05-0.2 wt. % or 0.1-0.25 wt. %.

11. The raw material composition for the R-T-B series permanent magnet material according to claim 10, wherein the raw material composition for the R-T-B series permanent magnet material further comprises the element M, and the element M includes one or more of Al, Si, Sn, Ge, Ag, Au, Bi, Mn, Cr, Zr, Nb, and Hf.

12. A method for preparing an R-T-B series permanent magnet material, comprising the following step: subjecting a melt of the raw material composition for the R-T-B series permanent magnet material according to claim 10 to casting, crushing, pulverization, forming, sintering, a grain boundary diffusion treatment, and a heat treatment.

13. The preparation method according to claim 12, wherein the pulverization process is carried out in an atmosphere with an oxidizing gas content of 100 ppm or less;

or, after pulverization, a lubricant is added, in an amount of 0.05-0.15%, relative to the weight of the pulverized powder;

or, the heat treatment temperature is 470-510° C., 460-500° C., or 480-520° C.

14. An R-T-B series permanent magnet material prepared by the preparation method according to claim 12.

15. The raw material composition for the R-T-B series permanent magnet material according to claim 10, wherein, when Q includes Cu, the range of the content of Cu is 0.05-0.20 wt. %;

or, when Q includes Ga, the range of the content of Ga is 0.05-0.20 wt. %.

16. The raw material composition for the R-T-B series permanent magnet material according to claim 10, wherein, the type of RH includes Dy and/or Tb;

or, the range of the content of RH is 0.5-2 wt. %, exclusive of 0.5 wt. %.

* * * * *